United States Patent [19]

Wilkins et al.

[11] Patent Number: 5,215,675
[45] Date of Patent: Jun. 1, 1993

[54] AQUEOUS STRIPPING COMPOSITION CONTAINING PEROXIDE AND WATER SOLUBLE ESTER

[75] Inventors: Geoffrey J. Wilkins, London, United Kingdom; Frank Fusiak, Bayonne, N.J.

[73] Assignee: ISP Investments Inc., Wilmington, Del.

[21] Appl. No.: 851,587

[22] Filed: Mar. 16, 1992

[51] Int. Cl.$^5$ ............... C09D 9/04; C23D 17/00; C11D 3/39; C11D 3/43

[52] U.S. Cl. ............... 252/100; 134/2; 134/3; 134/38; 252/102; 252/104; 252/143; 252/148; 252/153; 252/162; 252/170; 252/171; 252/173; 252/542; 252/558; 252/559; 252/DIG. 8

[58] Field of Search ............... 134/2, 3, 38; 252/DIG. 8, 104, 153, 162, 170, 171, 542, 143, 173, 100, 102

[56] References Cited

U.S. PATENT DOCUMENTS

| | | | |
|---|---|---|---|
| 3,355,385 | 11/1967 | Mackley | 252/104 |
| 3,954,648 | 5/1976 | Belcak | 252/156 |
| 4,508,634 | 4/1985 | Elepano | 252/163 |
| 4,594,111 | 6/1986 | Coonan | 134/3 |
| 4,927,556 | 5/1990 | Pokorny | 252/173 |
| 4,956,115 | 9/1990 | Mark | 252/170 |
| 5,006,279 | 4/1991 | Grobbel | 252/542 |
| 5,085,795 | 2/1992 | Narayanan | 252/162 |
| 5,098,591 | 3/1992 | Stevens | 252/162 |
| 5,098,594 | 3/1992 | Doscher | 252/162 |
| 5,106,525 | 4/1992 | Sullivan | 252/162 |

*Primary Examiner*—Dennis Albrecht
*Attorney, Agent, or Firm*—Marilyn J. Maue; Joshua J. Ward

[57] ABSTRACT

This invention is directed to an environmentally safe, water soluble stripping composition which contains a solution of water, a water soluble ester containing from 4 to 10 carbon atoms and an amount of hydrogen peroxide or compounds which generate hydrogen peroxide in situ; which peroxide concentration is not in excess of 30 wt. % of the water/ester composition. The invention also concerns the use of this biodegradable composition in a process for stripping organic coatings such as paints and resins from substrates.

14 Claims, No Drawings

AQUEOUS STRIPPING COMPOSITION CONTAINING PEROXIDE AND WATER SOLUBLE ESTER

In one aspect, the invention relates to a biodegradable, water soluble stripping composition for the removal of paint, paint primers, varnishes and the like from a substrate, for example a metal surface. In another aspect the invention relates to the use of this composition in an ecologically safe stripping process.

BACKGROUND OF THE INVENTION

With the use of crosslinked epoxy and polyurethane paint systems containing heavy metals and paint primers containing chromates, there has arisen a need for a stripping agent which effectively removes these coatings without attacking the substrate base. Although paint strippers comprised mainly of strong acids have proven capable of removing such paints, their propensity for corrosion of metal substrates has limited their use. Alkaline activated paint removers, based on ammonia, amines and caustic agents have been proposed but have been found to be ineffective in such applications. The most active paint strippers to date are methylene chloride based compositions, however, such highly volatile halocarbons are environmentally objectionable and are suspected carcinogens. Although methylene chloride is fast acting, its effectiveness is short lived due to its volatility; thus, repeated applications of the stripper are required for the removal of all but very thin coated layers. To overcome the problem of volatility, N-alkyl pyrrolidones have been substituted in whole or in part for methylene chloride, however, such compositions are equally objectionable because of the lactam's hydrogen bonding properties in the presence of water leading a significant lowering of the stripping rate.

U.S. Pat. No. 3,355,385 proposes the use of ketones such as acetone and methyl ethyl ketone in formulations with peroxide to provide adequate stripping, but, like methylene chloride, these stripping agents have a short effective life since the ketone component is volatile and extremely flammable.

Other formulations have also failed to meet all of the requirements for stripping compositions such as a high stripping capability, non-flammability, biodegradability and/or freedom from carcinogenic or non-biodegradable chemicals. Accordingly, applicant's aim is to overcome the above difficulties and to provide an ecologically safe, water soluble, biodegradable stripping agent which is resistant to oxidation under ambient conditions and which is non-combustible It is another object of this invention to provide an ecologically safe stripping composition which effectively removes epoxy and polyurethane containing resinous coatings from a substrate and which minimizes environmental and personal hazards.

Another object is to provide a stripping composition which is non-corrosive to metal surfaces.

Still another object is to provide a process for using the present composition in the removal of resinous coatings without significant damage to aluminum or other metal surfaces.

These and other objects of the invention will become apparent from the following description and disclosure.

THE INVENTION

In accordance with this invention there is provided a water soluble stripping composition which comprises a solution of between about 1 and about 50 parts by weight of water, between about 1 and about 30 parts by weight of peroxide and between about 25 and about 95 parts by weight of a water soluble ester containing from 4 to 10 carbon atoms such as butyrolactone, ethyl lactate, diethylene glycol ethyl ether acetate, ethylene carbonate and the like, and mixtures thereof, represented as the essential components of a basic stripping composition. Preferred proportions of the above essential ingredients include between about 10 and about 40 parts by weight water, between about 3 and 15 parts by weight peroxide and between 30 and 80 parts by weight of the water soluble ester. The most optimum concentration of components are found to be 20-30 parts water, 5-10 parts peroxide and 40-70 parts ester, most preferably, butyrolactone.

The peroxide in the above composition can be present as an aqueous solution of hydrogen peroxide or it can represent the amount of hydrogen peroxide generated in situ from a water soluble peroxy compound or complex such as for example polyvinylpyrrolidone-hydrogen peroxide, urea peroxide and the like which liberates hydrogen peroxide upon contact with water.

The above compositions can be used to remove any resinous coating from a substrate. The composition can be applied by spraying, dipping, brushing, wiping on the coating of a plastic, glass, wood or metal surface or the coated substrate can be immersed in the above composition for separation of the coating. Examples of metal substrates which are stripped with the present composition include steel, aluminum, titanium, cadmium plated steel surfaces and other cladded or non-cladded metal surfaces. The composition, when administered to a coated surface, is generally applied in a thickness of from about 1/6" to about ¼" or in a thickness adequate to loosen the resinous coating as is consistent with dependent upon the chemical nature and thickness of the resinous coating. Also one or more applications of the stripping composition can be employed, when needed.

The present stripping composition optionally contains other additive components in about the following concentrations based on, total aqueous peroxide/ester content of the basic composition; however, it is understood that greater the amounts of these additives can be used but that, in most cases, such excess does not provide added benefit. Also it will become obvious from the following disclosure that many of the additive compounds serve dual functions.

More specifically, a water soluble surfactant in an amount between about 0.01 and about 10 weight % can be added to the basic composition so as to provide better wetting properties by lowering the surface tension of the formulation, thus insuring complete coverage and a more uniform coating on the coated substrate. The surfactant may also assist in removing and dislodging loosened coating particles during the stripping operation. Suitable surfactants include non-ionic, anionic, cationic or amphoteric types which include monocarboxyl cocoimidoazoline (e.g. ANTRON®), higher alkyl sulfate sodium salts (e.g. DUPONOL®), tridecyloxy poly(alkyleneoxy ethanol) (e.g. EMULPHOGENE®), ethoxylated or propoxylated alkyl phenol (e.g. IGEPAL®), alkyl sulfoamides (e.g. IGE- PON ®), C₁₀–C₁₈ alkaryl sulfonates (e.g. SANTOMERSE ®), cocoamphodipropionate (e.g. MIRANOL ®), cetylpalmitic alkanol amides (e.g. CENTROL ®), hydrogenated castor oil (e.g. PARASYN ®), isooctylphenyl polyethoxy ethanol (e.g. TRITON ®), sorbitan monopalmitate (e.g. SPAN ® 40), dodecylphenyl polyethylene glycol ether (e.g. TERGITROL ®), N-C₈ to C₁₈ alkyl pyrrolidone (e.g. SURFADONE ®), polyalkoxylated fatty acid esters (e.g. TRYDET ®), N-coco-β-amino propionic acid and polyethoxy amino salts thereof, sodium alkylbenzene sulfonate and mixtures of the above, such as a mixture of sodium alkylbenzene sulfonate and SURFADONE ®. Examples of other suitable surfactants are described by Cahn et al., "Surfactants and Detersive Systems", 1983, published by John Wiley & Sons in Kirk-Othmer's Encyclopedia of Chemical Technology, 3rd Ed. (1983), pages 332–432.

Chelating agents in an amount of between about 0.01 and about 10 weight % can also be added to the above composition when stripping metal surfaces so as to complex with metal ions which may cause degradation of the peroxide. Examples of such chelating agents include ethylene diamine tetraacetic acid (EDTA) and its metal salts, nitrilotriacetic acid and metal salts, diethylene triamine pentaacetic acid, polyphosphates, diketones, hydroxy carboxylic acids and phosphonic acids, e.g. Dequest (available from Monsanto), and the like. Stabilizers for the hydrogen peroxide in an amount of between about 0.01 and about 1 weight % can also be added to extend the bath life of the composition when needed. Illustrative of these additives are C₁ to C₄ alkyl anilines, aromatic sulfonic acids, sulfamic acids, sulfones, sulfoxides, sulfolenes, sulfolanes, amino aryl sulfonic acid, benzene disulfonic acid, p-tolyl sulfonic acid, sulfanilic acid, propylene glycol, glycolic acid, glycerine, propionic acid, benzoic acid, cis-4-butenediol and the like or mixtures thereof.

To minimize corrosion of metal surfaces, certain corrosion inhibitors in an amount of from 0.1 to about 3 wt. % may also be included, examples of which are an ethoxylated butynediol, petroleum sulfonates (e.g. Alox 575), and blends of propargyl alcohol and thiourea, e.g. Rodine supplied by Amchem Products Inc. or Armohib supplied by Akzo Chemicals Inc. For extending the life of the composition, evaporation retardants can be used in an amount between about 0.1 and about 5 weight % of the basic composition of which siloxane, stearic acid, a paraffinic wax or beeswax are examples. For cost reduction, cosolvents or diluents can be used to extend the stripping composition and to reduce formulation cost. Examples of such additives are alkylene glycol ethers, such as triethylene glycol methyl ether, propylene glycol methyl ether, tripropylene glycol methyl ether, diethylene glycol ethyl ether, etc., propylene carbonate, alcohols and glycols, such as ethylene glycol, propylene glycol, cyclohexanol, tetrahydrofurfuryl alcohol etc., substituted lactams such as N-methyl-2-pyrrolidone; dimethyl imidiazolidinone, tetramethyl urea and mixtures of the above diluents. Also, solvents having a hydrogen bonding value equal to, or approaching zero, e.g. dipentenes and C₆ to C₁₀ hydrocarbons are useful, particularly in admixture with N-methyl pyrrolidone.

Additionally, coactivators can be used with the peroxide compound to further boost the activity of the basic composition. Such coactivators are acids having a pka value less than 4, however, caution should be observed since these acids are corrosive to metal surfaces. Generally, not more than 25% of the coactivator is desirable in the above basic composition. In any case, the corrosive properties of these acids must be balanced against the benefits of faster stripping. To avoid significant corrosion, it is recommended that less than 9% of the coactivator be employed in treating metal substrates. Examples of such acid coactivators include glycolic, sulfuric, phosphoric and formic acids, and mixtures thereof. Buffers can be used in the above acid environment to control the pH to about 3–4.5 and thus minimizing corrosive effects on metals and decreasing the rate of ester hydrolysis while increasing the life of the stripping composition. Organoamine buffers such as triethanolamine, morpholine, triethylamine, amino ethyl pyrrolidone, and the like or their mixtures are suitably employed.

For certain applications where large coated surfaces militate against immersion or where vertical surfaces are to be sprayed, thickening agents can be used to retain the composition on the coating surface for an extended contact time sufficient to loosen the coating. The thickeners employed are those which are stable with respect to peroxides and can be added to a concentration of between about 0.5 and about 20 weight % of the basic composition. Examples of such additives include carboxy polymethylenes, thickeners of the cellulose type, e.g. hydroxypropyl cellulose (e.g. Klucel), ethyl cellulose, ethyl hydroxyethyl cellulose, methyl cellulose, colloidal silica, clays such as bentonite, starch, colloidal alumina, gum arabic, tragacanth, agar, acylic acid/1% polyallyl ether of sucrose (e.g. Carbopol 934 or 940), high molecular weight polyethylene oxides, polyoxyethylene-polyoxypropylene glycol-block copolymers, guar gum, xanthan gum, polyvinylpyrrolidone and methyl vinyl ether/maleic anhydride copolymers. It is also to be understood that any of the above diluents can be added to lower the viscosity of the stripping composition for certain applications.

Of the above thickeners, those of the cellulose type are preferred and Klucel, containing repeating units of anhydroglucose

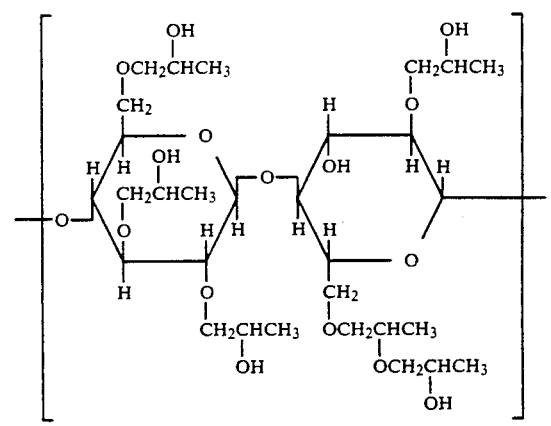

in which 4 or more of the hydroxyl groups are converted to ether or hydroxyalkyl groups, is particularly preferred.

Representative of some typical and general formulations are the following:

| PARTS BY WEIGHT COMBINED IN A 100% COMPOSITION | | |
|---|---|---|
| | Preferred | Optimum |
| A. | | |
| Water | 10–40 | 20–30 |
| H₂O₂ | 3–15 | 5–10 |
| Water Soluble Ester | 30–80 | 40–70 |
| B. | | |
| Water | 10–40 | 20–30 |
| H₂O₂ | 3–15 | 5–10 |
| Water Soluble Ester | 30–80 | 40–70 |
| Cosolvent/diluent | 0–50 | 20–30 |
| Surfactant | 0–5 | 2–3 |
| Chelating Agent | 0–5 | 0.05–1.0 |
| Thickening Agent | 0–5 | 1–3 |
| Buffering Agent | 0–10 | 4–6 |
| Coactivator | 0–15 | 2–10 |
| C. | | |
| Water | 1–50 | 20–30 |
| H₂O₂ | 1–30 | 7–10 |
| Water Soluble Ester | 25–95 | 50–60 |
| Surfactant | 1–4 | 2–3 |

Generally the thickening agent, when needed, is added after the other components are mixed to form a homogeneous composition. The order of addition for the other components is not critical, however, to maximize safety, it is recommended that the peroxide be added last.

Although composition A is suitable for the removal of resinous coatings, generally the present compositions also include a surfactant and more often chelating and stabilizing agents. Additionally, the inclusion of a cosolvent and diluent is useful for extending the stripping composition is certain applications. Buffers, coactivators and corrosion inhibitors can also be employed for more difficulty removable coatings.

The above compositions are easily prepared by slowly adding aqueous hydrogen peroxide or an aqueous solution of the organic peroxide compound, alone or in admixture with a coactivator, to the remaining components of the overall composition and before the addition of any viscosity adjusting adjuvant. The addition is made with agitation at room temperature until a homogeneous solution is formed. Thickeners or diluents, when needed, are added after the homogeneous mixture is obtained, and in cases where high molecular weight thickeners are employed, the solution can be slightly heated up to about 40° C. to assist in their incorporation. The composition is then applied to the coated substrate under ambient conditions or, when faster stripping is required, at a temperature up to 45° C. The stripping operation can be carried out until the coating is separated from the substrate, usually within a period of from about 10 minutes to about 24 hours, normally not more than 8 hours and often less than 4 hours, depending on the particular stripping composition, the thickness and chemical composition of the coating involved. The loosened resinous particles are then brushed off or washed away with a water spray leaving a clean substrate surface.

The present stripping compositions are particularly beneficial in removing paint primers, varnishes and paints, including polyurethane and epoxy paints, from metal or other surfaces. Since the present composition is capable of oxidizing heavy metals found in paints and primers, their use in stripping significantly reduces the need for waste after-treatment. Other, equally important advantages of the present stripping compositions include water solubility, a decreased organic solvent content and biodegradability. Further, the stable esters of the composition resist oxidation attack under ambient conditions and are non-volatile and non-flammable in contrast to ketones or methylene chloride used in other formulations. Additionally, instant stripping compositions are non-combustible and contain none of the harmful and ecologically objectionable components of other stripping formulations which include halogenated compounds, aromatics, phenols and/or chromates. The above advantages make for ideal stripping conditions in a wide field of applications for the removal of paints, varnishes, inks, primer coatings, lacquers, enamels, shellacs and other resinous coatings which may be used to protect or to decorate a substrate. The present compositions are particularly well suited in the stripping of paints from metal surfaces of aircraft.

Having generally described the invention, reference is now had to the following examples which illustrate preferred embodiments but which are not to be construed as limiting to the scope of the invention as more broadly defined above and in the appended claims.

EXAMPLE 1

The compositions shown in following Table I were prepared under ambient conditions. The components (parts by weight) were added and mixed in the order listed using a standard laboratory stirrer and were blended until homogeneous solutions were obtained.

TABLE I

| Components | A | B | C | D | E | F | G | H | I | J | K | L | M |
|---|---|---|---|---|---|---|---|---|---|---|---|---|---|
| Gamma-Butyrolactone | 60.0 | — | — | — | 60.0 | — | 40.5 | 35.0 | 42.0 | 40.5 | 54.75 | 65.0 | 59.0 |
| N-methyl-2-pyrrolidone | — | — | — | — | — | — | 19.5 | — | 42.0 | 20.0 | — | — | — |
| Ethyl lactate | — | 60.0 | — | — | — | — | — | — | — | — | — | — | — |
| Diethylene glycol ethyl ether acetate | — | — | 60.0 | — | — | — | — | — | — | — | — | — | — |
| Ethylene carbonate | — | — | — | 60.0 | — | — | — | — | — | — | — | — | — |
| Propylene carbonate | — | — | — | — | — | — | — | 35.0 | — | — | — | — | — |
| Formic Acid, 95% | — | — | — | — | — | — | — | 15.0 | — | — | 9.5 | 15.0 | 27.5 |
| Water, deionized | — | — | — | — | 32.5 | 60.0 | — | — | — | — | — | — | 9.25 |
| EDTA tetrasodium salt | 0.5 | 0.5 | 0.5 | 0.5 | 0.5 | 0.5 | 0.5 | — | — | — | — | — | — |
| N-dodecyl pyrrolidone (Surfadone ® LP-300) | 1.0 | 1.0 | 1.0 | 1.0 | 1.0 | 1.0 | 1.0 | — | — | — | 0.75 | — | — |
| N-octyl pyrrolidone (Surfadone ® LP-100) | — | — | — | — | — | — | — | 1.0 | 1.0 | 1.0 | — | 1.0 | 0.25 |
| Sodium dodecyl benzene sulfonate | 3.0 | 3.0 | 3.0 | 3.0 | 3.0 | 3.0 | 3.0 | 1.0 | — | 3.0 | 2.0 | — | — |
| Ethoxylated butynediol (Butoxyne ® 497) | 1.0 | 1.0 | 1.0 | 1.0 | 1.0 | 1.0 | 1.0 | — | — | 1.0 | 1.0 | — | 1.0 |
| H₂O₂ (30 wt % aqueous) | 32.5 | 32.5 | 32.5 | 32.5 | — | 32.5 | 32.5 | 12.0 | 14.0 | — | — | 13.0 | — |
| H₂O₂ (20 vol % aqueous) | — | — | — | — | — | — | — | — | — | 32.5 | 30.0 | — | — |

TABLE I-continued

| Components | A | B | C | D | E | F | G | H | I | J | K | L | M |
|---|---|---|---|---|---|---|---|---|---|---|---|---|---|
| Carbopol ® 940 | 2.0 | 2.0 | 2.0 | 2.0 | 2.0 | 2.0 | 2.0 | — | — | — | — | — | — |
| Klucel ® H | — | — | — | — | — | — | — | 1.0 | 1.0 | 2.0 | 2.0 | 1.0 | 1.0 |
| Polyvinylpyrrolidone K-30 | — | — | — | — | — | — | — | — | — | — | — | 5.0 | — |
| Polydimethylsiloxane | — | — | — | — | — | — | — | — | — | — | — | — | 2.0 |

EXAMPLE 2

A coated aluminum alloy (2024) sample was obtained from United Airlines. The coating consisted of a primer coat and a top coat. The primer coat, Desoto 513×377/910 ×482, is defined as a pigmented epoxy polyimide containing an unpigmented polyamide activator (see Boeing Specification BMS-1079, Type 2, Class B). The top coat, Desoto 821×583/910×619, is defined as a pigmented polyurethane base containing an unpigmented isocyanate activator (see United Airlines Specification PAI 3760-2).

The above sample was cut into 13 panels of 1×3 inches. Each panel was sealed around its edges with paraffin wax to prevent stripper seepage at the edge of the panel and to simulate the surface of aircraft.

Each of the above stripping compositions (A-M) was individually tested by applying about a 2 g. solution on a coated panel surface and allowing the treated panel to stand under ambient conditions until blistering occurred. The panels were then rinsed with a stream of water and evaluated for % removal of coating. The results of these evaluations are reported in following Table II.

TABLE II

| Formula | % Coating Removal | Time | Remarks |
|---|---|---|---|
| A | 100% | 1 hr. 10 mins. | |
| B | 100% | 2 hrs. 20 mins. | |
| C | 100% | 10 hrs. | |
| D | 100% | 3 hrs. | |
| E | 0% | 24 hrs. | (no $H_2O_2$ present) |
| F | 0% | 24 hrs. | (no esters present |
| G | 100% | 1 hr. 40 mins. | |
| H | 100% | 3 hrs. | |
| I | 90% | 3 hrs. | |
| J | 100% | 1 hr. 45 mins. | |
| K | 100% | 45 mins. | |
| L | 100% | 25-30 mins. | |
| M | 100% | 3 hrs. | (acid-activated without peroxide) |

EXAMPLE 3

The Boeing Company (Commercial Airplane Division) corrosion test D6-17487 was performed on stripping compositions J, K and M. Filter papers saturated with the respective stripping compositions were inserted between two bare aluminum alloy panels (type 2024) and subjected to a series of exposure cycles, i.e. 6 hours at 38° C. and ambient humidity followed by 16 hours at 38° C. and about 97% relative humidity. This cycle was repeated for a period of 7 days, after which the % corrosion of the adjacent aluminum panels was evaluated against a control which consisted of a filter paper saturated with deionized water between the aluminum panels. To meet specifications, the stripping composition must not exceed the corrosion of the control. The results of this evaluation is shown in following Table III.

TABLE III

| Substrate | % Corrosion |
|---|---|
| Control | 57 |
| J | 5 |
| K | 55 |
| M | 75 |

It is to be understood that any of the other additive components described above, in the prescribed proportions, can be substituted or added to the compositions described in Example 1 to provide similarly beneficial stripping properties for resinous coatings.

What is claimed is:

1. A water soluble, biodegradable paint stripping composition for the separation of a resinous coating from the surface of a substrate which consists essentially of an aqueous solution of (a) between about 10 and about 50 parts by weight water, (b) between about 3 and about 15 parts by weight peroxide and (c) between about 40 and about 70 parts by weight of ethyl lactate; (a), (b) and (c) being combined to form 100% composition.

2. The composition of claim 1 wherein said peroxide is an organic peroxide.

3. The composition of claim 1 wherein said peroxide is hydrogen peroxide.

4. The composition of claim 1 comprising between about 10 and about 40 parts by weight water.

5. The composition of claim 1 comprising between about 20 and about 30 parts by weight water and between about 5 and about 10 parts by weight hydrogen peroxide.

6. The composition of claim 1 wherein said composition additionally contains a minor amount of a modifying additive selected from the group of a surfactant, a chelating agent, a peroxide stabilizer, a corrosion inhibitor, a cosolvent, an evaporation retardant, a coactivator, a buffer, a thickener, a diluent and mixtures thereof.

7. The composition of claim 1 wherein said composition contains an acid coactivator in an amount up to about 15 than 9 wt. % of the composition.

8. The composition of claims 1 wherein said composition contains a surfactant of $N-C_8$ to $C_{12}$ alkyl pyrrolidone.

9. The composition of one of claims 1 or 8 wherein said composition contains between about 0.01 and about 1 weight % of ethylene diamine tetraacetic acid as a chelating agent.

10. The composition of claim 2 or 3 wherein said composition contains up to 9.5% formic acid coactivator.

11. The composition of claim 1 which contains about 60 parts by weight ethyl lactate, about 0.5 parts by weight of the tetrasodium salt of ethylenediaminetetraacetic acid, about 1 part by weight N-alkyl pyrrolidone surfactant, about 3 parts by weight Na dodecyl benzene sulfonate, about 1 parts by weight ethoxylated butynediol, about 32 parts by weight aqueous $H_2O_2$ wherein said $H_2O_2$ is present in an amount of between about 5 and 10 parts by weight/20-30 parts by weight of water, and about 2 parts by weight organic thickener.

12. A water soluble stripping composition for separating a resinous coating from the surface of a substrate consisting essentially of about 40 parts by weight butyrolactone, about 20 parts by weight N-methyl pyrrolidone, about 1part by weight N-alkyl pyrrolidone surfactant, about 3parts by weight Na dodecyl benzene sulfonate, about 1 part by weight ethoxylated butynediol, about 32 parts by weight aqueous $H_2O_2$ wherein said $H_2O_2$ is present in an amount of between about 5-10 parts by weight/20-30 parts by weight of water, about 2parts by weight organic thickener and optionally about 0.5 parts by weight of the tetrasodium salt of ethylenediaminetetraacetic acid.

13. A water soluble stripping composition for separating a resinous coating from the surface of a substrate consisting essentially of about 55 to 60 parts by weight butyrolactone, about 1 part by weight N-alkyl pyrrolidone surfactant, about 2-3 parts by weight Na dodecyl benzene sulfonate, about 1 part by weight ethoxylated butynediol, about 30 to 32.5 parts by weight aqueous $H_2O_2$ wherein said $H_2O_2$ is present in an amount of between about 5-10 parts by weight/20-30 parts by weight of water, about 2 parts by weight organic thickener and optionally about 0.5 parts by weight of the tetrasodium salt of ethylenediaminetetraacetic acid and up to 9.5 parts by weight formic acid.

14. The process of stripping a resinous coating from a substrate which comprises applying an effective stripping amount of the composition of any one of claims 1, 2, 3 and 6 to said coating at a temperature of from about 20° C. to about 45° C. for a period sufficient to separate said coating from said substrate.

* * * * *